(No Model.)
R. R. JAMES.
POTATO DIGGER.
No. 302,139. Patented July 15, 1884.
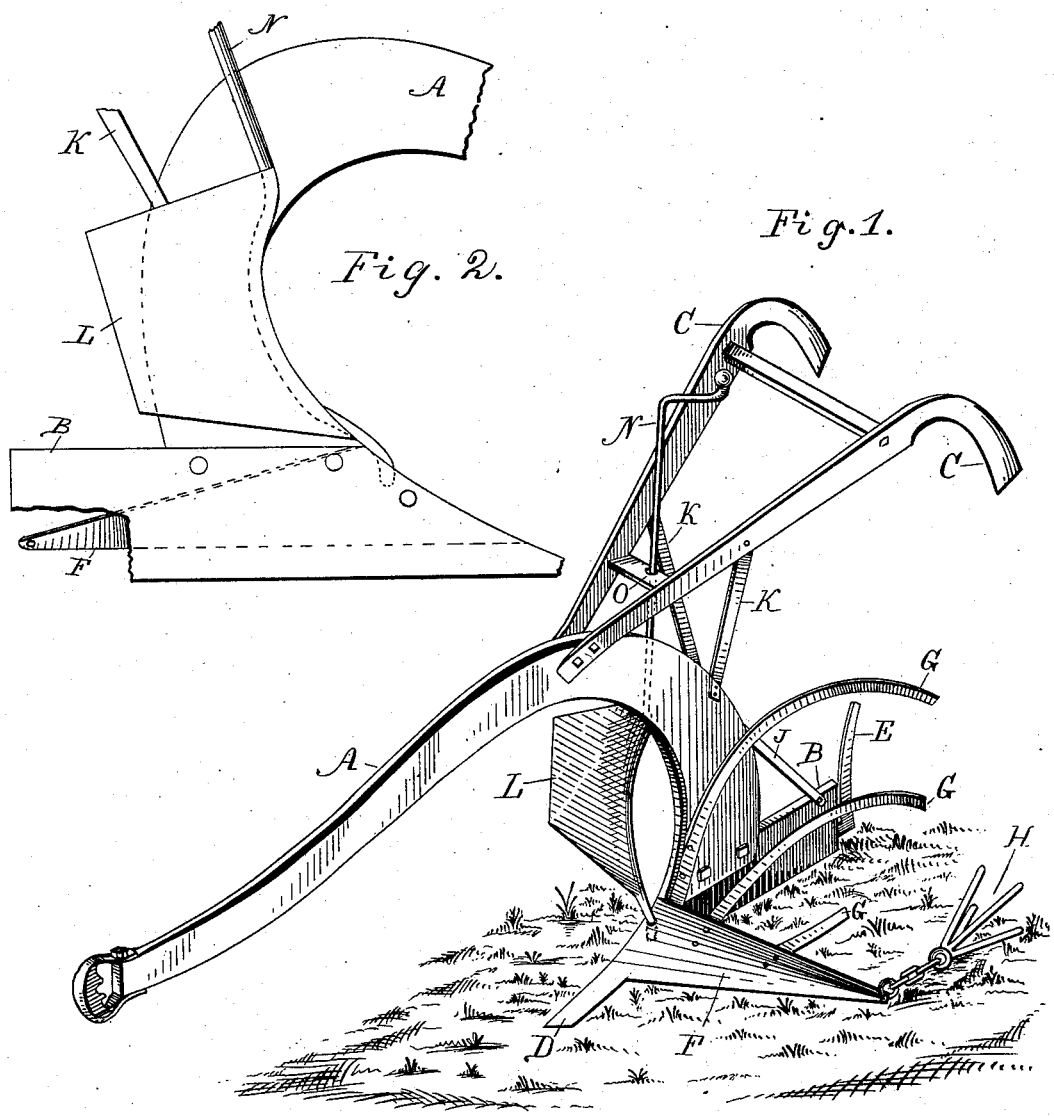
WITNESSES:
Thos. Houghton.
A. G. Lyne.
INVENTOR:
Reuben R. James
BY Munn & Co.
ATTORNEYS.

UNITED STATES PATENT OFFICE.

REUBEN R. JAMES, OF RISING SUN, INDIANA.

POTATO-DIGGER.

SPECIFICATION forming part of Letters Patent No. 302,139, dated July 15, 1884.

Application filed February 28, 1884. (No model.)

*To all whom it may concern:*

Be it known that I, REUBEN R. JAMES, of Rising Sun, in the county of Ohio and State of Indiana, have invented a new and useful Improvement in Potato-Diggers, of which the following is a full, clear, and exact description, reference being had to the annexed drawings, forming part of this specification.

This invention relates to plows for turning potatoes out of the ground; and it consists of the construction hereinafter described and claimed.

Figure 1 is a perspective view of my improved potato-digger, showing the blade L moved forward from its normal position; and Fig. 2 is a partial side elevation of the same, showing the opposite side of the plow from that shown in Fig. 1, and showing the blade L in normal position.

A indicates the plow beam and stock, formed in one piece, having the landside-bar B and handles C. The bar B has a steel point, D, welded thereto, and a heel-bar, E, secured to its rear end and extending upward and outward therefrom, for breaking the soil on the land side.

F is the share, bolted to the landside-bar a short distance above the bottom of said bar, to give it a bearing in the soil to keep the plow from jumping sidewise from the pressure on the share.

In the place of the usual mold-board of a plow, curved bars or fingers G are secured to the share and stock at a suitable distance apart to allow the soil and potatoes to pass between them, affording sufficient resistance to the passage of the potatoes to rake them out to the surface of the ground, and at the same time turning weeds, vines, &c., out of the way. To the rear end of the share is attached by a short chain a drag, H, having four branching prongs for raking the soil and laying bare any potatoes that may be covered thereby.

J is a brace-bar extending from the stock to the heel of the landside-bar, and K K are braces extending from the stock to the handles C. On the landside of the plow is a vertical blade or wing, L, which is secured to a crank-rod, N, loosely supported in the share at the bottom, and in a bearing, O, attached to one of the handles C. The edge of the blade or wing is curved to conform to the front edge of the stock, along which it lies when in normal position, and is designed for cutting and turning away or throwing aside weeds, vines, &c., that may catch on the stock. By turning the crank-rod the blade is thrown to the position shown in Fig. 1, by which movement any weeds adhering to the stock will be turned aside.

I do not broadly claim curved bars or fingers arranged in the position of a mold-board, such construction being common in potato-diggers and other plows.

What I claim is—

1. The combination, with the plow-stock and the landside-bar, of the share arranged with its lower edge above the lower edge of said bar, in order that said bar may serve as a guide for keeping the share in the ground, the curved bars or fingers G, arranged in the position of a mold-board, the bar E, secured to the landside-bar, and the drag H, attached to the rear end of the share, substantially as shown and described.

2. The combination, with the plow-stock, of the pivoted blade L, having the crank-rod N, and being arranged to rest in a vertical position at one side of the stock, with its cutting-edge extended along the front of the stock, substantially as shown and described.

REUBEN R. JAMES.

Witnesses:
JOHN W. MILLER,
GRANT HEMPHILL.